United States Patent [19]

Grabenhorst et al.

[11] Patent Number: 5,479,399

[45] Date of Patent: Dec. 26, 1995

[54] METHOD FOR SERVICING A TRUNKLINE AMONG DATA CONNECTIONS HAVING DIFFERENT DATA RATES WHEREIN ALL DATA CONNECTIONS ARE GIVEN FAIR ALLOCATION TO THE TRUNKLINE

[75] Inventors: Rolf Grabenhorst; Eckhard Schroeder; Gerd Niestegge, all of Munich, Germany

[73] Assignee: Siemens Aktiengesellschaft, Munich, Germany

[21] Appl. No.: 9,679

[22] Filed: Jan. 27, 1993

[30] Foreign Application Priority Data

Jan. 30, 1992 [EP] European Pat. Off. .............. 92101546

[51] Int. Cl.⁶ ....................................... H04J 3/12
[52] U.S. Cl. ................... 370/58.1; 395/250; 395/826; 364/231.4; 364/238; 364/238.2; 364/DIG. 1
[58] Field of Search ..................................... 395/200, 275, 395/250; 370/58.1, 58.2, 58.3, 59, 60, 60.1, 61, 62, 63, 64, 66, 68, 68.1

[56] References Cited

U.S. PATENT DOCUMENTS

| | | | |
|---|---|---|---|
| 3,700,820 | 10/1972 | Blasbalg et al. | 370/82 |
| 4,145,735 | 3/1979 | Soga | 395/275 |
| 4,160,126 | 7/1979 | Bejavek | 370/58.1 |
| 4,970,720 | 11/1990 | Esaki | 370/85.2 |
| 5,005,171 | 4/1991 | Modisette, Jr. et al. | 370/110.1 |
| 5,007,048 | 4/1991 | Kowalk | 370/60 |
| 5,128,924 | 7/1992 | Le Bihan | 370/13 |
| 5,132,964 | 7/1992 | Esaki | 370/60 |
| 5,231,633 | 7/1993 | Hluchyj et al. | 370/94.1 |
| 5,268,900 | 12/1993 | Hluchyj et al. | 370/94.1 |
| 5,313,455 | 5/1994 | van der Wal et al. | 370/13 |

FOREIGN PATENT DOCUMENTS 2625528  3/1978  Germany.

OTHER PUBLICATIONS

Turner "New Directions in Communications (or Which Way to the Information Age?" 1986 International Zurich Seminar on Digital Communications Mar. 11–13, 1986, pp. 25–32.
Becker et al., "A Protocol and Prototype for Broadband Subscriber Access to ISDN", Bell Communications Research Inc. 1987 pp 462–469.
Katevenis et al., "Weighted Round–Robin Cell Multiplexing in a General–Purpose ATM Switch Chip", IEEE Journal on Selected Areas in Communication, vol. 9, No. 8, 10–91 pp. 1265–1279.
Japanese Application (Abstract), "Data Transfer Control System" Hitoshi Kousokabe, May 16, 1986, Appl No. 59–111399.

*Primary Examiner*—Thomas C. Lee
*Assistant Examiner*—Sang Hui Kim
*Attorney, Agent, or Firm*—Hill, Steadman & Simpson

[57] ABSTRACT

For a virtual connection set up using an asynchronous transmission method which transmits information cells with a rate which is not constant over a relatively long period, the maximum rate may be limited, on the one hand, and the access of the information cells to a trunk line carrying information cells of a plurality of virtual connections may be regulated, on the other hand. As a result, the rate of information cells of a virtual connection is limited.

7 Claims, 2 Drawing Sheets

METHOD FOR SERVICING A TRUNKLINE AMONG DATA CONNECTIONS HAVING DIFFERENT DATA RATES WHEREIN ALL DATA CONNECTIONS ARE GIVEN FAIR ALLOCATION TO THE TRUNKLINE

BACKGROUND OF THE INVENTION

In communication systems in which data are transmitted by an asynchronous transmission method, in the data field of information cells, both data connections with high data rates and data connections with low data rates, can be offered. However, the transmission of large data records, occurring, for example, when data copies are transmitted in digitized form at a data rate which is at the limit of the transport data rate of the transmission system, can lead to congestion when other connections are set up.

In addition, data connections which have a higher peak value of the data rate than the transport data rate of the transmission system cannot be offered. Furthermore, over-proportional charging must be expected when connections having high data rates, even if transmission in the shortest possible time is not required.

SUMMARY OF THE INVENTION

It is, therefore, an object of the present invention to provide a method according to which the access of data output by a plurality of data terminals to a trunk line common to the data terminals is regulated. Furthermore, a method according to which the data output by a data terminal at a rate which is not constant is provided as seen over a relatively long period and/or forwarded to the trunk line at a data rate which is between the mean value and the peak value.

It is, therefore, an object of the present invention to provide a method for regulating the access of data exhibiting a predetermined number of data items, which blocks belong to a plurality of data connections, to a trunk line which is capable of transporting in time slots, in each case one information cell exhibiting a data field accommodating the data block and a header preceding the former and designating the respective data connection, in accordance with an asynchronous transmission method.

The method includes writing the data blocks into data-connection-individual buffer memories; establishing a respective data block rate for each data connection; providing a counter for each data connection; releasing data connections, the counters of which have dropped below a predetermined count for forwarding a data block to the trunk line; forwarding a data block from the associated buffer memory to the trunk line for a respective data connection which exhibits a respective lowest count in the current time slots; incrementing the count of the data connection for which a data block is forwarded to the trunk line during a current time slot by a value corresponding to the associated data block rate; and decrementing the count of the data connections for which no data block is forwarded during a current time slot.

It is known, for example, from a report in International Zurich Seminar on Digital Communications of March 1986, entitled "New Directions in Communications", A.3.1 to A.3.8 by J. B. Turner, to allocate in a switching node of a broadband switching system transmitting information cells in accordance with an asynchronous transmission method to each subscriber installation connected thereto. An up/down counter counts the information cells sent by the respective subscriber installation and decrements the instantaneous count in accordance with a transmission rate determined by the respective subscriber installation at particular times. If, in this process, the instantaneous count exceeds a value predetermined by the respective subscriber installation, the switching node recognizes an overload (the "leaky-bucket" method).

The leaky-bucket method limits the defined peak value of the rate of the information cells sent by a subscriber installation. Information cells which lead to a defined rate being exceeded are discarded. Furthermore, reduction in the rate of information cells sent by a subscriber installation does not occur below the peak value. In addition, the leaky-bucket method per se does not contribute to solving access contentions on a trunk common to a number of subscriber installations.

The invention is advantageous in that the data output by a data terminal, the peak data rate of which exceeds the maximum transport data rate of the trunk line (ATM pipe) on which the data are to be transmitted, or transmitted when the mean value of the data rate of the data is lower than the transport data rate. Furthermore, sequences of data which are output in the manner of bursts by a data terminal are smoothed which, on the one hand, counteracts congestion on a trunk line common to a plurality of data terminals and, on the other hand, leads to an increase in the throughput rate in the switching device switching through the data.

Furthermore, in addition to already existing connections, further connections can be set up, if necessary. Moreover, a fair allocation of the access of data to a trunk line common to a plurality of connections, taking into consideration the data rate defined for the respective connections, is achieved. Finally, a data device user may be able to claim a more favorable charging rate in the case of an over-proportional rise in the charging rate with the defined data rate.

Further advantages of the invention include embodiments in which data terminals output the data either as a component of an information cell or in the form of data blocks which are packeted in information cells only immediately before being forwarded to the trunk line. To utilize the full transport capacity of the information cells, it is proposed to accommodate as many data items in an information cell as the information cell is capable of accommodating in its data field. A balanced offer of data connections is obtained when the same data block rate is defined for all data connections taking into consideration the overall transport capacity of the trunk line.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
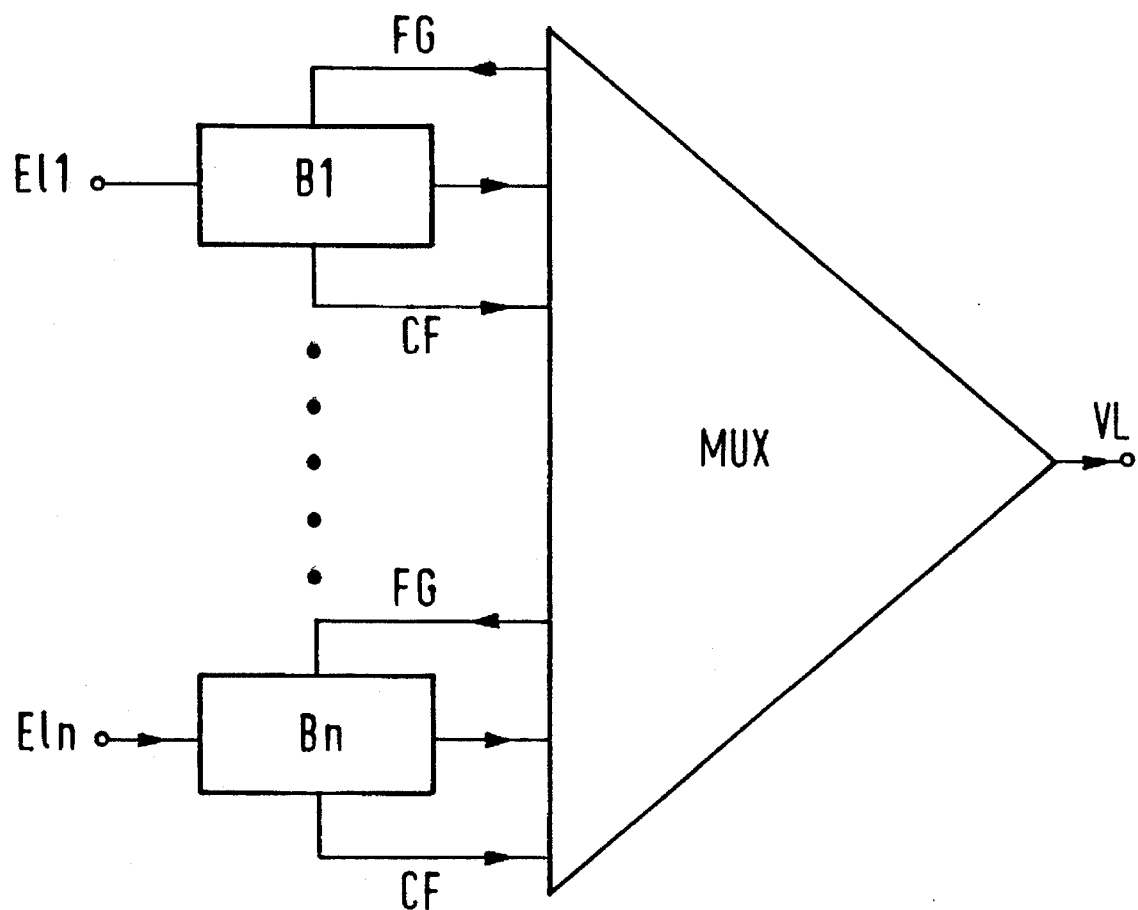
FIG. 1 illustrates a diagram of a system for performing the method according to the present invention.

FIG. 1 illustrates a system which combines data output by data terminals (not shown in detail) on associated input lines El1 . . . Eln, in a combining facility MUX to form a data stream (for example, a so-called gateway in a customer premises network (CPN)) and transmits these data via a trunk line VL carrying the data stream to a remote receiving facility (not shown).

The data stream on the trunk line VL is transported in accordance with an asynchronous transmission method in which the data is transmitted in information cells exhibiting a data field of predetermined length and a header preceding the former and designating the respective data connection. Each input line El1 . . . Eln is allocated a respective buffer memory B1 . . . Bn which is organized as a FIFO memory and is capable of temporarily storing a large data record comprising a multiplicity of data which is output by the associated data terminal, such as, for example, a photographic original in digitized form.

The data output by the data terminals is present either as data blocks exhibiting a predetermined number of data items or in the form of information cells in accordance with another embodiment of the invention.

The buffer memories B1 . . . Bn may output a signal to the combining facility in each case by a connection CF as long as data is temporarily stored in a relevant buffer memory B1 . . . Bn. The combining facility MUX is capable of causing a relevant buffer memory B1 . . . Bn via a respective connection FG to release a data block exhibiting a predetermined number of data items or, respectively, to release an information cell via a respective link. The combining facility has a counter for each input line El1 . . . Eln, which counter is capable of assuming a number of states which can be represented by eight bits.

Figure 2:
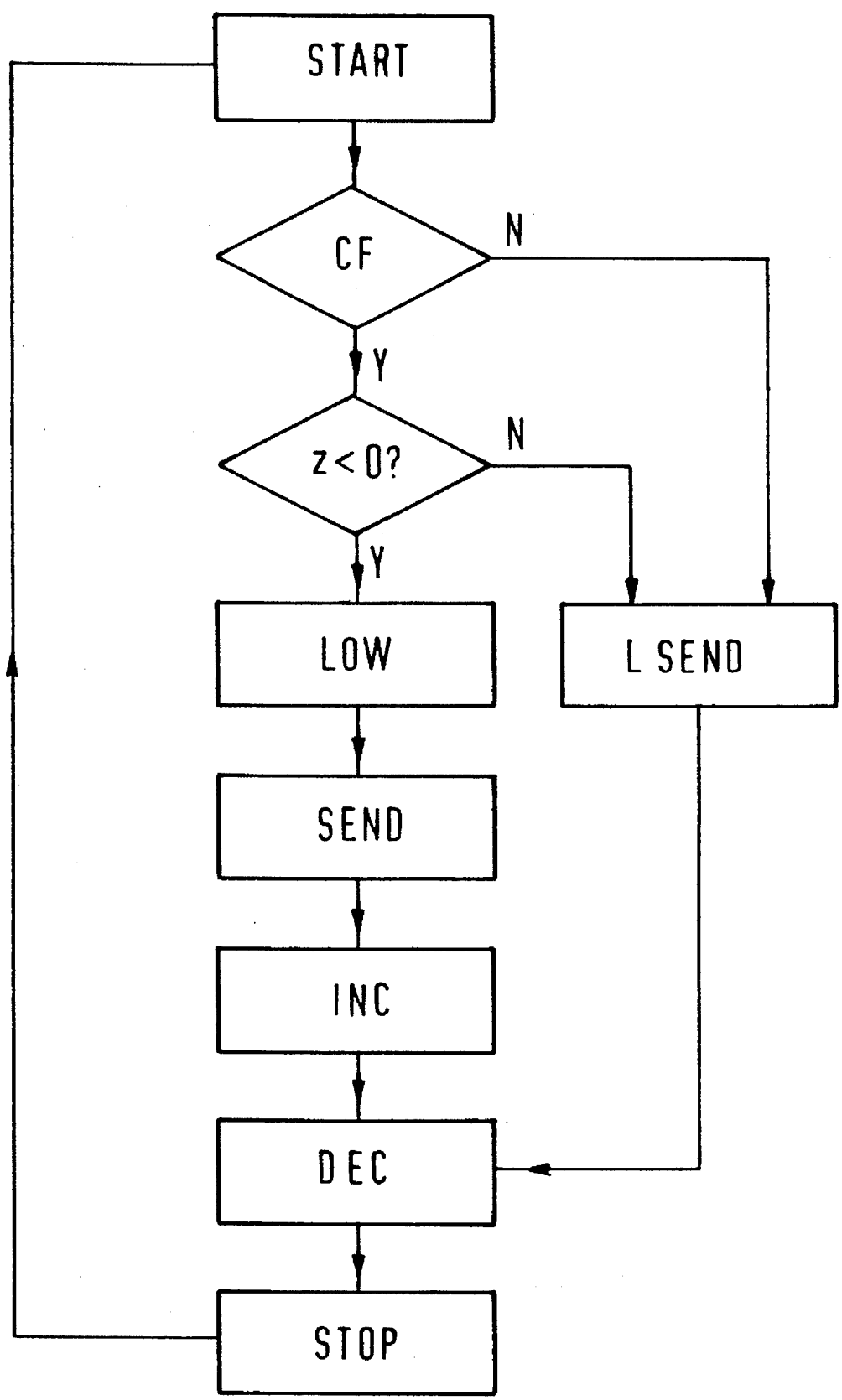
FIG. 2 is a flowchart of the method according to the present invention.

The flowchart of FIG. 2 illustrates a more detailed operation of the combining facility MUX of FIG. 1.

As shown in FIG. 2, the flowchart illustrates typical processes occurring during a particular time slot. During the setting up of each data connection, an increment is established for the data connection to the value of which the associated counter is set. The increment can be considered as a value for the number of information cells of other data connections, which can, on an average, be forwarded between two information cells of the data connection considered. Therefore, three information cells of other data connections, for example, are on an average forwarded for a value of three for the increment of a data connection between two information cells of the data connection even if further information cells are currently ready for the data connection being considered.

As shown in FIG. 2, all buffer memories are interrogated for the presence of data blocks in the decision field CF. The interrogation is preferably cyclic in the order in which the input lines are designated. Where no data block is temporarily stored in any of the buffer memories, the flowchart follows "N" and the process continues with the execution field LSEND. In the case where a data block is temporarily stored in at least one buffer memory, the flowchart progresses with a "Y" response and the process checks in accordance with the decision field Z whether the associated counters of buffer memories which have just temporarily stored data blocks drop below a predetermined count.

Dropping below the predetermined count can be brought about, for example, by dropping below the count zero as shown in the flowchart of FIG. 2. In a counter, the states of which are represented by a plurality of bits, the most significant bit (MSB) can be advantageously used for evaluating a drop below the value of zero.

In this case, the current drops below the value of zero when the MSB has a high logic level. If none of the counters has dropped below the predetermined value (N), the process continues with the execution field SEND in which a dummy cell is caused to be forwarded to the trunk line. A dummy cell is produced when it does not contain any data in its data field.

From the execution field LSEND, the flowchart continues with the execution field DEC. First, however, the further sequence should be continued with a positive result (Y) in the decision field Z. That is, at least one of the counters has dropped below the predetermined value.

In the execution field LOW, a respective data connection is determined, the counter of which has a respective lowest count. If more than one counter has a respective lowest count at the same time during a time slot, the process can be continued in such a manner that a data block is forwarded for that data connection which, in the cyclic interrogation in the order according to the designations of the input lines, is the first to follow the data connection for which a data block was last forwarded. In accordance with execution field SEND, a data block is forwarded to the trunk line from the buffer memory belonging to the respective counter determined.

In this connection, a data block has the same number of data items that the data field of an information cell is capable of accommodating. According to another embodiment of the invention, the data blocks in the combining facility are received in the data field of a respective information cell in a packeting facility common to all data connections and are then forwarded.

Referring again to FIG. 2, the count of the counter for the data connection of which a data block has just been forwarded is incremented by the value corresponding to the associated agreed data block rate in execution field INC. In execution field DEC, the counters of all connections which have not forwarded a data block during the current time slot are decremented by the value of one. From execution field STOP, the process continues with the execution field START for the subsequent time slot and again goes through the flowchart.

The description of the flowchart shows that data connections which have not sent out a data block, despite dropping below the predetermined value count of the associated counter, for example, because the counter of another data connection has shown a lower count, at a count which has been decremented further in the subsequent time slot, and, therefore, have improved chances for sending out a data block. After a data block has been forwarded for an initially disadvantaged data connection, the associated counter, after incrementation by the value corresponding to the defined data block rate, has a correspondingly lower count as a result of which the rate count drops below the predetermined count correspondingly earlier. Therefore, the release for forwarding a data block is reached correspondingly earlier, on average, for the data connection considered as a result of which the predetermined data block rate occurs.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for regulating access of data blocks having a predetermined number of data which belong to a plurality of data connections to a trunk line which is used for transporting in time slots in each case one information cell exhibiting a data field accommodating the data block and a header preceding the former which designates the respective data connection in accordance with an asynchronous transmission method, the method comprising the steps of:

writing the data blocks into data-connection-individual buffer memories;

establishing a respective data block rate for each data connection;

providing a counter for each data connection;

designating those of the data connections in which the counters are below a predetermined count for forwarding a data block to the trunk line;

forwarding a data block from the associated buffer memory to the trunk line for a respective data connection which exhibits a respective lowest count in the current time slot;

incrementing the count of the data connection for which a data block is forwarded to the trunk line during a time slot by a value corresponding to the associated data block rate; and decrementing the count of those of the data connections for which no data block is forwarded during a current time slot.

2. The method according to claim 1 further comprising the step of:

packeting the data blocks in the data field of an information cell after having been released and before being forwarded to the trunk line.

3. The method of claim 1 wherein the data blocks are part of an information cell.

4. The method of claim 1 wherein the same data block rate is defined for each data connection.

5. The method of claim 1 wherein the data blocks have the same number of data as the data field of an information cell is capable of accommodating.

6. The method of claim 1 further comprising the step of:

storing temporarily the data blocks which have not yet been forwarded.

7. The method of claim 6 wherein the temporarily stored data blocks are stored separately for each data connection.

* * * * *